Aug. 25, 1931. M. FALKOVITZ Re. 18,171

POCKET CONSTRUCTION FOR TROUSERS

Original Filed March 10, 1928

INVENTOR
Morris Falkovitz
By W. W. Williamson
Atty.

Reissued Aug. 25, 1931

Re. 18,171

UNITED STATES PATENT OFFICE

MORRIS FALKOVITZ, OF PHILADELPHIA, PENNSYLVANIA

POCKET CONSTRUCTION FOR TROUSERS

Original No. 1,748,836, dated February 25, 1930, Serial No. 260,777, filed March 10, 1928. This application for reissue filed April 11, 1931. Serial No. 529,538.

The present invention relates to pockets for trousers and has for its principal object to provide a tape about the connected edges of the pocket, suitably secured thereto to form a closure for one edge of the pocket and utilizing the same tape attaching means for securing the pocket to the garment along another of the edges of said pocket.

Another object of the invention is to arrange a tape about one of the connected edges of the pocket material which is subjected to the greatest amount of wear to provide a seam for such edge of the pocket which is as strong and durable as the usual tailor's pocket and as inexpensive and easily formed as the usual machine pocket.

A still further object of the invention is to provide a pocket structure in which the steps necessary for securing the same in a proper position to the garment are materially reduced whereby to permit the manufacture of the garment in a more economical and expeditious manner.

Other objects and advantages reside in the special construction and combination of the various elements comprising the invention, reference being had to the accompanying drawings forming a part hereof, wherein:—

Figure 1:
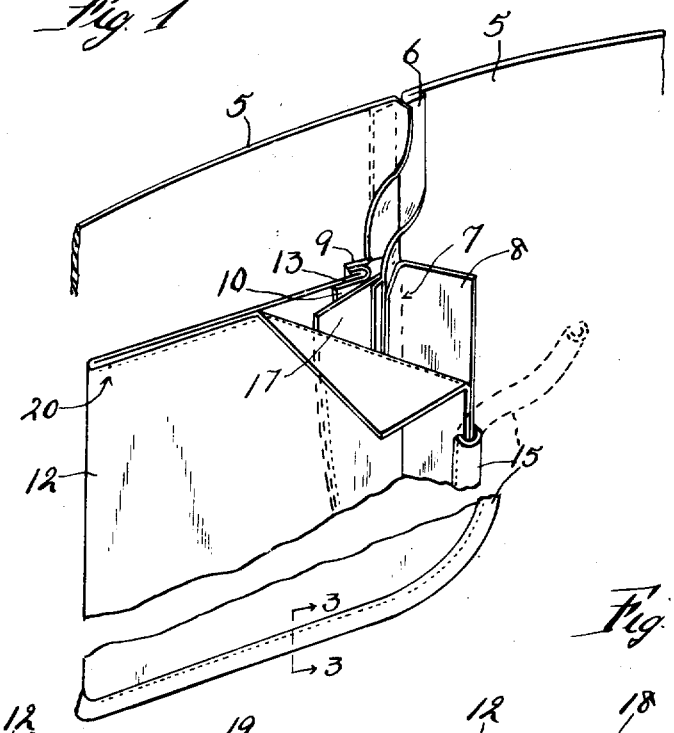
Figure 2:
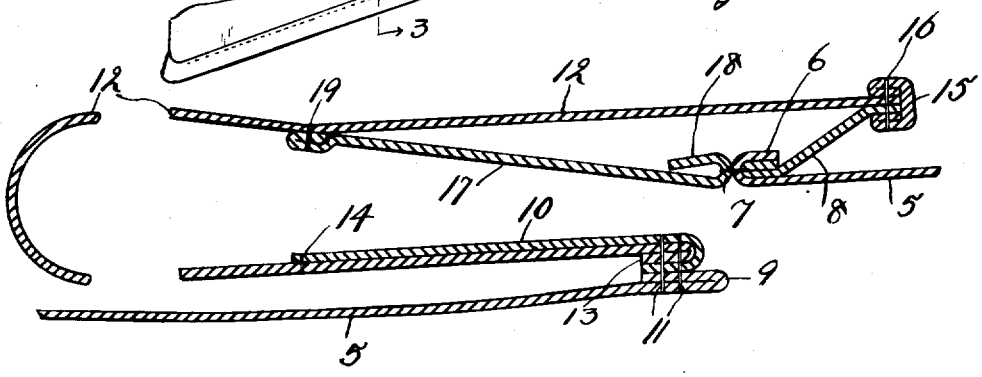
Figure 3:
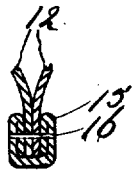

Fig. 1, is a perspective view of the portion of a garment having a pocket opening illustrating the manner in which the pocket is secured in position about the edges of such opening, Fig. 2, is a transverse sectional view through the pocket and section of the garment with which the same is attached, and Fig. 3, is a sectional view through the bottom edge of the pocket taken along a line 3—3 of Fig. 1.

Referring now to the drawings in detail, I have shown my invention arranged to be used upon a pair of trousers composed of a series of interconnected sections indicated at 5 and having their adjacent edges turned inwardly to form folds 6 and having their inturned folded sections secured by sewing threads 7 therethrough. The connected edges of the garment section thus form a seam as clearly shown in Fig. 1, of the drawings.

Arranged to project from one of the folded edges 6 is a strip of material 8 the same being a turned in part or parts of the seam or a separate section of suitable fabric. When produced from a separate section of material the strip is secured adjacent one edge thereof to said folded edge by the same stitching 7 provided for connecting the sections of the garment to each other. The strip of material 8, if it is a separate element, is located between the folded edge 6 of one of the garment sections 5 and preferably terminates slightly below the upper edge of the garment at a point adjacent the top of the pocket opening which is formed by a break in the seam, said break occurring for a suitable distance to provide a pocket opening of conventional and appropriate size.

The edge of one of the garment sections extending along such break in the seam is folded inwardly as shown at 9 and has attached thereto one edge of a strip of material 10, suitably secured by a row of stitching 11, said strip being folded back upon itself in a direction toward the interior of the pocket opening.

A garment pocket 12 of the usual shape is secured about the edges of said pocket opening, said pocket, as clearly illustrated in Figure 1 of the drawings, being formed of a section of material folded upon itself with one of its edges indicated at 13 being disposed in alinement with the inturned edges of the fold 9 and material strip 10. The threads 11 extend entirely through the adjacent end 13 of the pocket and the fold 9 whereby to secure the same to each other as clearly shown in Figure 2 of the drawings with the strip of material 10 extending inwardly between the folds of the pocket 12 and secured to the adjacent side thereof by a row of stitching 14.

The other edge of the pocket 12 is arranged in alinement with the free edge of the strip of material 8 and is secured in position thereto by means of a strip of tape 15, the edges of the tape being folded inwardly in a manner well known in the art, the tape being secured in position about the edge of the pocket 12 and strip 8 by stitching 16 which extends entirely through the fold of the tape as well as the edges of the pocket and strip.

As clearly shown in Fig. 1 of the drawings the tape 15 extends entirely along the edge of the pocket disposed adjacent the strip 8 and also entirely along the under side thereof, thereby serving to close the bottom edge of the pocket as well as the side of the same.

The edge of the pocket 12 to which the tape 15 is attached extends slightly beyond the opposite edge 13 of the pocket and in order to hide the fold 6 and edge of material 8 alined therewith adjacent the pocket opening, I provide a connecting piece of material 17 having one edge 18 folded against the fold 6 and secured thereto and also to the adjacent edge of the strip of material 8, by means of the stitching 7, which thereby provides a seam along one edge of the pocket opening. The opposite edge of the strip 17 extends inwardly of the pocket and is folded backwardly upon itself against the inner surface of the pocket and secured thereto by a row of stitching 19, which stitching, it is apparent, may extend throughout the length of the strip and across the lower edge thereof. The strips 8 and 17 are secured at their upper edges to the pocket material by the stitching 20.

After the pocket has been secured in position about the pocket opening in the manner indicated the upper edge of the material forming the pocket 12 is secured by stitching 20.

It will thus be apparent that the pocket is entirely closed except by way of the pocket opening formed in the seam between the two sections of the garment material.

Furthermore as clearly shown in Fig. 1 of the drawings it will be apparent that the bottom edge of the pocket and one edge of the pocket material is closed by the tape by the same stitching which is utilized to attach the same to the pocket at the same time the edge of the pocket is secured to the strip of material 8 by means of which the pocket is attached to the garment.

This manner of closing the bottom edge of the pocket and at the same time securing one of its side edges to the garment eliminates the necessity of several separate sewing operations which are usually required in a pocket construction and in addition no loose edges of the pocket material are formed within the pocket, as is present in the usual tailor made pocket, and which is objectionable because of its tendency to unravel and collect loose dirt about the seam of the pocket material. The manner in which the tape serves to eliminate these loose edges of the pocket material is clearly illustrated in Fig. 3 of the drawings.

It is obvious that the invention susceptible of various changes and modifications, without departing from the spirit or scope of the invention or sacrificing any of its advantages, and I accordingly claim all such forms of the device to which I am entitled.

Having thus described my invention, what I claim as new is:

1. In a pocket structure, a garment having a pocket opening formed at the adjoining edges of a pair of the sections of the garment material, the marginal portion of said material within the opening being folded inwardly and rearwardly upon itself, a section of pocket material folded upon itself with its open side edges disposed at the respective sides of the pocket openings, a pair of strips of fabric disposed with one edge at opposite sides of the garment material at one edge of the pocket opening, one of said strips having a folded marginal portion within the adjacent folds in the material edge, the other of said strips having a folded back portion abutting the folds in the material edge, said strips having their opposite edges secured to one side of the pocket material, and stitching provided for securing the sections of the garment material to each other and for securing the edges of the pair of strips to one edge of one of the garment sections at one edge of the pocket opening, said stitching extending through the fold line of the strip and the material, the other of said side edges of the pocket material being attached directly to the outer section of the garment of the pocket opening, and said pair of strips of material being adapted to lie flat against the pocket material and extended in opposite directions from their garment attached edge.

2. In a garment having a pocket opening formed at the adjoining edges of a pair of the sections of the garment material, a strip of material projecting from one side of the pocket opening and within the garment, a pocket having its open side edges disposed at the respective sides of the pocket opening with one of said pocket side edges coinciding with the longer free edge of the projecting strip of material, and a tape secured to the projecting strip of material and one layer of the pocket in the region of said strip of material and both layers of said pocket below the strip of material for closing the joints between the several parts with the raw edges disposed in the folds of the tape.

MORRIS FALKOVITZ.